G. WHARTON.
Gang Plow.
No. 80,039.
Patented July 14, 1868.
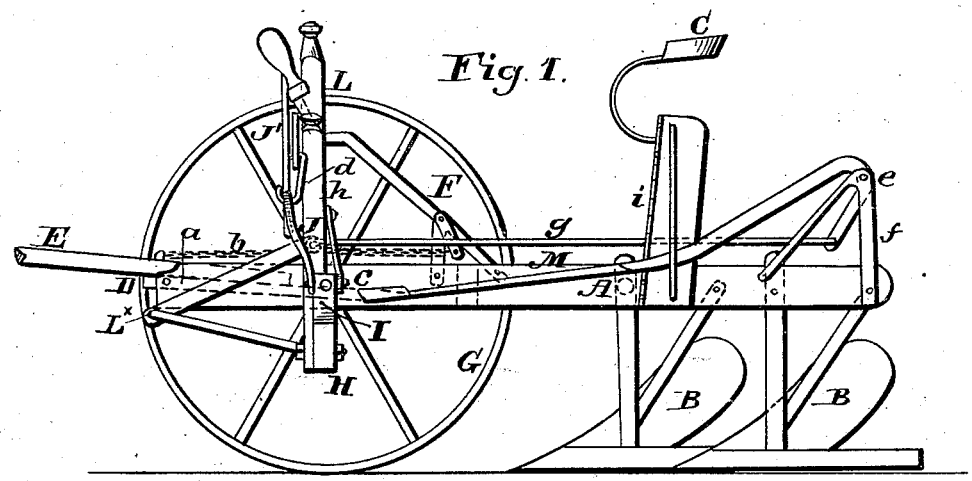
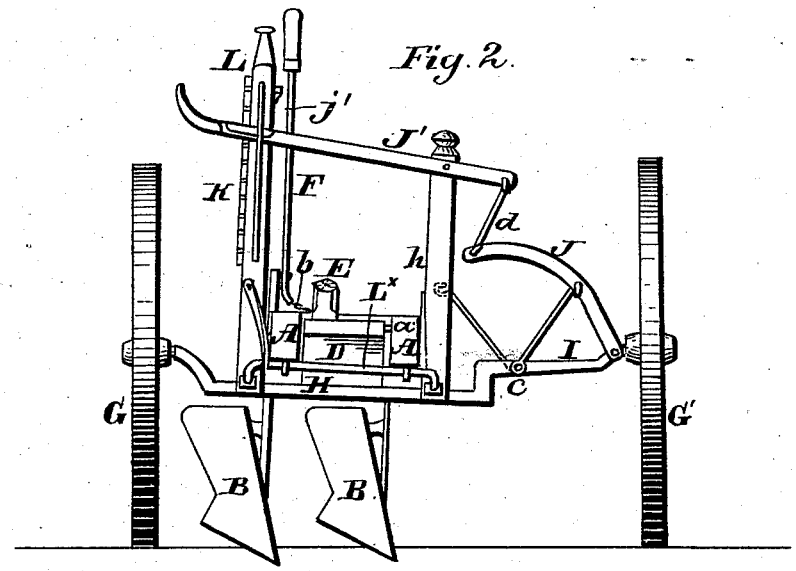
Witnesses:
Wm A. Morgan
G. C. Cotton
Inventor:
Geo. Wharton
Per Munn &co
Attorneys

United States Patent Office.

GEORGE WHARTON, OF JERSEYVILLE, ILLINOIS.

Letters Patent No. 80,039, dated July 14, 1868.

IMPROVEMENT IN GANG-PLOWS.

The Schedule referred to in these Letters Patent and making part of the same.

TO ALL WHOM IT MAY CONCERN:

Be it known that I, GEORGE WHARTON, of Jerseyville, in the county of Jersey, and State of Illinois, have invented a new and improved Gang-Plow; and I do hereby declare that the following is a full, clear, and exact description thereof, which will enable those skilled in the art to make and use the same, reference being had to the accompanying drawings, forming part of this specification.

This invention relates to a new and improved gang-plow, and it consists in a peculiar construction of the same, as hereinafter fully shown and described, whereby the plows may be operated (raised and lowered) by the driver with the greatest facility, and also made to conform to the uneven surface of the ground, so as to operate or turn a furrow-slice in a perfect manner, whether the ground be level, undulating, or more or less inclined.

In the accompanying sheet of drawings—

Figure 1 is a side view of my invention, with the wheel nearest the eye removed.

Figure 2, a front view of the same.

Similar letters of reference indicate corresponding parts.

A A represent two parallel beams connected by suitable cross-bars, and having plows B B attached to their rear parts, one plow being slightly in advance of the other, as shown in fig. 1.

C is the driver's seat, which is at the rear parts of the beams A A, and

D is a treadle-platform, the front part of which is fitted on a shaft, $a$, which passes transversely through the front parts of the beams A A, said treadle-platform extending back within convenient reach of the feet of the driver on seat C.

E is the draught-pole, which is attached to the treadle-platform D in such a manner that it may be adjusted laterally to the right or left, to give the plows more or less land, as may be required.

F is a lever, which is attached to the right-hand plow-beam A, within convenient reach of the driver on seat C, and is connected at its lower end by a chain, $b$, with the draught-pole E.

The front parts of the beams A A are supported by two wheels G G', which are fitted loosely on an axle, composed of two parts, H I, connected by a joint, $c$.

These wheels G G' are of equal diameter, but the wheel G', on the part I of the axle, may be more or less inclined by adjusting the part I through the media of the levers J J' connected by a link, $d$, the lever J' being retained at any point within the scope of its movement by means of a rack, K, attached to a post, L, the lower end of said post being secured to the part H of the axle.

By this means the plows may be made to work horizontally when the machine is passing over uneven ground.

The front ends of the plow-beams A A are fitted loosely on a rod or shaft, L$^\times$, the ends of which extend backward, and are secured to the part H of the axle, and M is a foot-lever, which has its fulcrum-pin, $e$, passing through a support, $f$, on the left-hand beam A, the rear part of said lever being curved or bent, and connected by a rod, $g$, to a post, $h$, which is attached to the part H of the axle, near the left-hand beam A.

The front part of the foot-lever M extends forward, so that it can be readily acted upon by the foot of the driver, and said lever may be retained at any point within the scope of its movement by means of a rack, $i$, attached to one of the supports of the driver's seat.

By depressing the front end of the lever M, the points of the plows may be raised, and by shoving forward the lever F, the plows may be raised entirely out of the ground, the lever F being retained in a forward position by a catch, $j$, on post L.

By this arrangement the plows are allowed to pass over small obstructions without any trouble or difficulty whatever, and may be raised entirely out of and free from the ground when necessary, and the plows are also allowed to conform to the inequalities of the surface of the ground, and a very simple adjustment required, in order to make the plows work horizontally in inclined ground.

I claim as new, and desire to secure by Letters Patent—

1. Constructing the axle of two parts, H I, connected by a joint, c, in combination with the two levers J J', all arranged and applied substantially in the manner as and for the purpose set forth.

2. The foot-lever M, connected with one of the beams A, and to the post h of the axle, as shown, in combination with the shaft $L^\times$, secured to the axle, and having the front ends of the beam A fitted loosely to it, all arranged to operate substantially as and for the purpose specified.

3. The treadle-platform D, draught-pole E, and the lever F, connected to the draught-pole by chain b, all combined and arranged substantially as and for the purpose set forth.

GEORGE WHARTON.

Witnesses:
    GEO. H. JACKSON,
    L. LAURENT.